Figure 12:
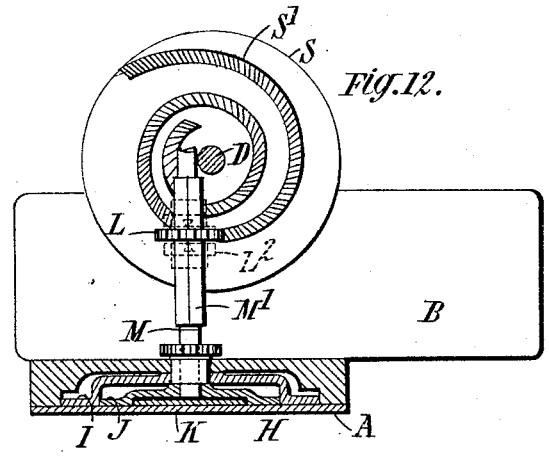
Figure 13:
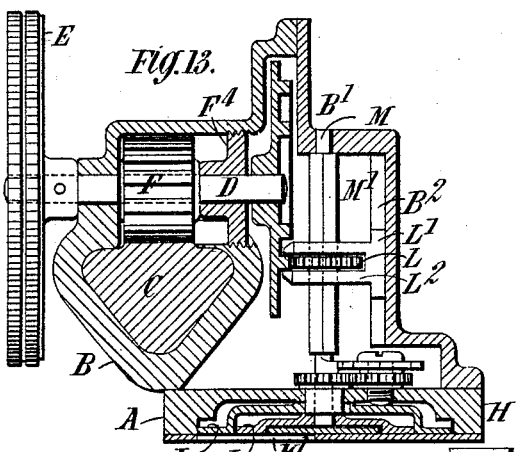
Figure 14:
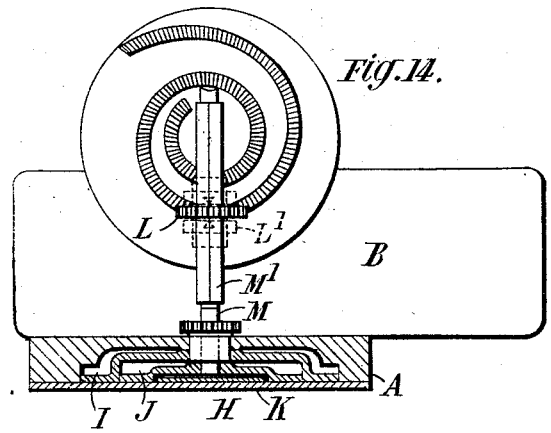

(No Model.) 3 Sheets—Sheet 1.
H. H. GRENFELL.
SIGHTING AND INDICATING APPARATUS FOR ORDNANCE.
No. 517,746. Patented Apr. 3, 1894.
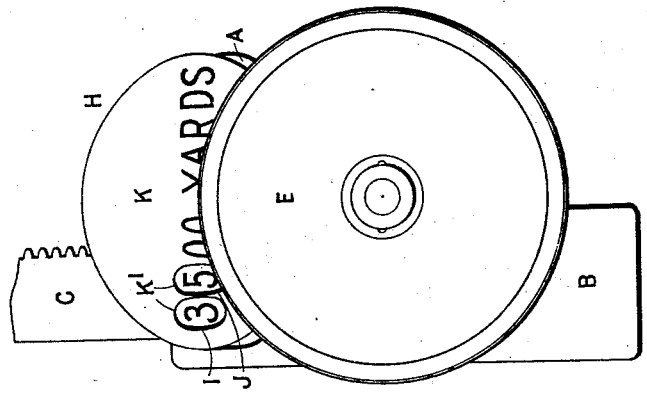
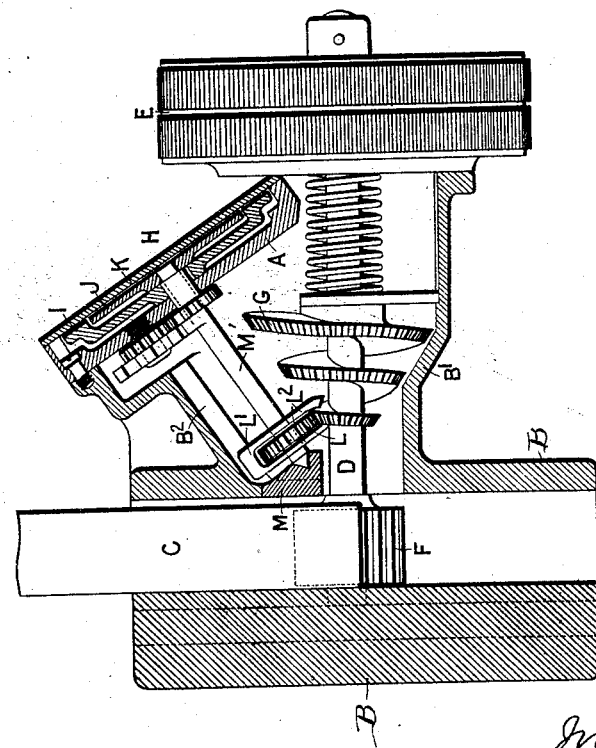

(No Model.) 3 Sheets—Sheet 2.
H. H. GRENFELL.
SIGHTING AND INDICATING APPARATUS FOR ORDNANCE.
No. 517,746. Patented Apr. 3, 1894.
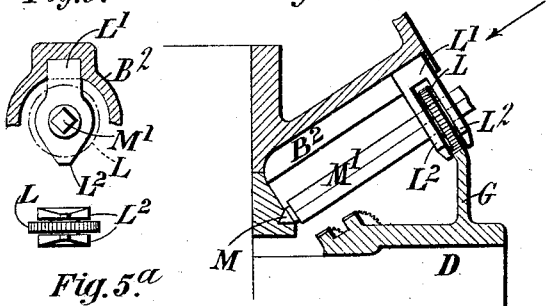
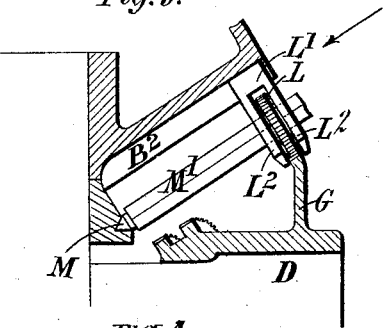
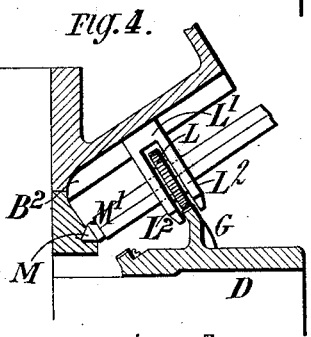
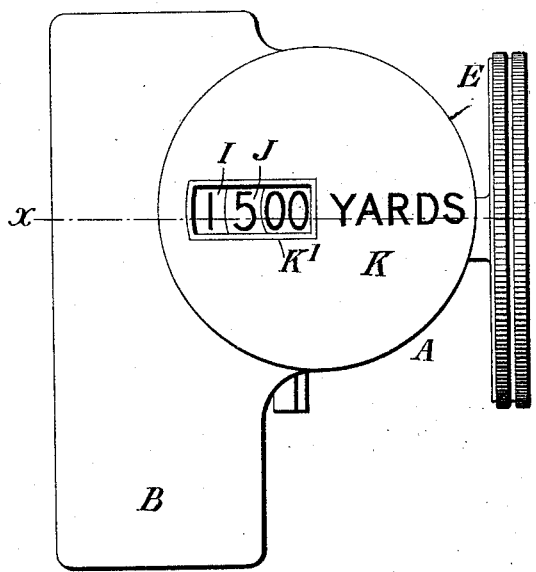
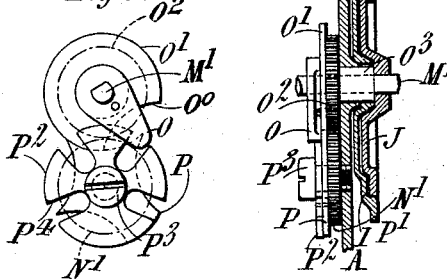
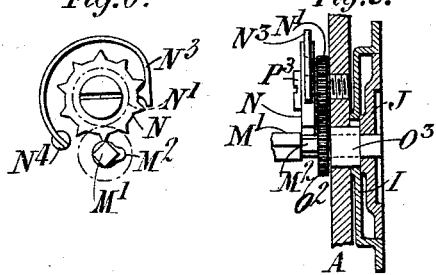
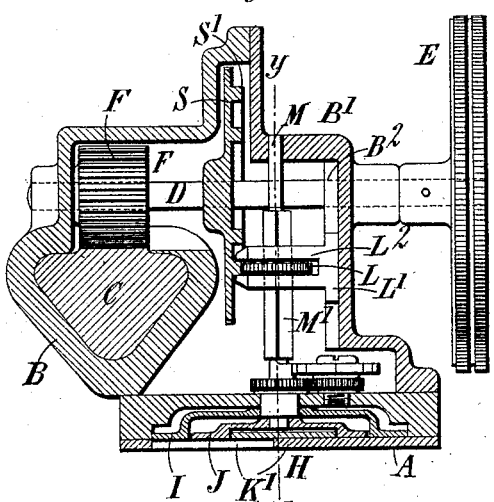

(No Model.) 3 Sheets—Sheet 3.

H. H. GRENFELL.
SIGHTING AND INDICATING APPARATUS FOR ORDNANCE.

No. 517,746. Patented Apr. 3, 1894.

Witnesses:
A. H. Norris
Dennis Sumby

Inventor:
Hubert Henry Grenfell,
By James L. Norris, Atty.

UNITED STATES PATENT OFFICE.

HUBERT HENRY GRENFELL, OF LONDON, ENGLAND.

SIGHTING AND INDICATING APPARATUS FOR ORDNANCE.

SPECIFICATION forming part of Letters Patent No. 517,746, dated April 3, 1894.

Application filed April 6, 1893. Serial No. 469,282. (No model.)

*To all whom it may concern:*

Be it known that I, HUBERT HENRY GRENFELL, captain in the Royal Navy, a subject of the Queen of Great Britain, and a resident of London, England, have invented certain new and useful Improvements Relating to Sighting and Indicating Apparatus for Ordnance, of which the following is a specification, reference being had to the accompanying drawings.

In a sighting apparatus previously invented by me there is an improved range-indicator in combination with a curved sight bar. The said range-indicator has two, three or more rotary disks upon which the figures denoting tens, hundreds, thousands and tens of thousands if required are marked. The said disks are inclosed in a case formed or fixed on the sight bar socket. The case has an outer disk or cover wherein I form a slit or aperture through which the figures on the rotating disks can be seen. In line with this slit or aperture I mark on the cover one, two or more ciphers followed by the word "yards;" these ciphers, with the figures which appear through the said slit or aperature, indicate the number of yards of the range or distance of the object at which the gun is pointed. One of the rotating disks is fixed upon a spindle which extends through a hollow spindle that carries the other rotating disk. The inner spindle has on it a pinion which gears with the rack of the sight-bar. At regular intervals in the series of rack teeth there are extended or long teeth which form another rack to gear with a pinion on the hollow spindle for intermittently rotating the disk carried thereby.

My present invention consists chiefly in the combination of a range indicator, such as that above described with a straight sight bar by means of a peculiar arrangement of gearing whereby, notwithstanding the varying lengths of movement of the bar to correspond with equal increments of range of the gun the indicator disks are operated in such a manner as to give correct indications of all ranges of the gun.

In order that my said invention may be clearly understood I will now proceed to describe the same with reference to the accompanying drawings, in which—

Figure 1 is a sectional elevation of one form of an improved sighting and indicating device constructed according to my invention and Fig. 2 is an elevation of the same, at right angles to Fig. 1. Figs. 3 and 4 illustrate two positions of working parts such as are employed in the apparatus illustrated in Figs. 1 and 2. Fig. 5 is an elevation of part of Fig. 3, as it appears if viewed in the direction of the arrow in the last named figure. Fig. 5$^a$ is an under side view of part of Fig. 5. Figs. 6, 7, 8, and 9 are views of the gearing employed to connect the rotatay indicating-disks hereinafter referred to, and Figs. 10 to 17 are views, hereinafter particularly described, of indicating-devices provided with internal mechanism different from the mechanism in the indicator shown in Figs. 1 and 2.

Like letters of reference indicate corresponding parts throughout the drawings.

With reference first to Figs. 1 and 2 A is the case or box of the indicator. B is the sight bar socket on the gun. B' is a bracket formed upon the socket B. C is a straight sight bar with a toothed rack formed thereon. D is a spindle carried in said socket. E is a milled wheel or disk secured to the outer end of the spindle D. F is an ordinary toothed pinion secured to the inner end of the spindle D and gearing with the rack on the sight bar. The said spindle also has fixed on it a spirally formed taper wheel or spiral rack G having a series of teeth on its peripheral surface as shown. H is the indicator constructed as hereinbefore described. I and J are the indicating disks thereof, and K is the outer disk or cover of the indicator through the slits or apertures K' of which, the figures on the rotating disks can be seen as in Fig. 2. It is obvious that the tens may be indicated by a rotating disk, and also that a disk may be provided to indicate tens of thousands if desired. L is a pinion on the spindle M of the indicator which spindle has its inner end supported in a bearing on the aforesaid socket B. The said pinion L gears with the wheel G which consists of a spiral, having a number of turns about its axis, and of varying diameter throughout the whole length of its periphery; it is therefore obvious that special provision must be made for keeping the said wheel in gear with the pinion L. With this object I arrange the said pinion within a box L' which is fitted to slide upon a square part M' of the spindle M and has cheeks L² which extend over the edge of the spiral wheel; and which box is arranged to engage with a guide rib B² on the socket so that as the spiral wheel presents different parts of its periphery to the pinion the latter slides upon the part M' of the spindle and thereby maintains its proper connection with the said spiral wheel.

In Fig. 1 the box L' is shown in the position it occupies when the pinion L is in gear with the wheel G at a point where the radius of the latter is small, and in Figs. 3 and 4 the same parts are shown in the positions they occupy as the acting radius of the wheel G increases.

The operation of the said improved sighting and indicating device will now be described:—It will be seen that while the velocity ratio of the straight sight bar C with respect to the spindle D is constant that of the indicator spindle M with respect to the spindle D is variable, and if the proper relative proportions of the parts have been secured in the construction and arrangement of the same the varied movements of the bar C which correspond with the different angles of elevation of the gun for similar increments of the range, will coincide with a constant movement of the indicator disk J and the range therefore in every position of the gun will be correctly recorded and shown on the indicator, I thus obtain with a straight sight bar the advantage which I have heretofore obtained with a curved bar in respect of clear and distinct indications of all ranges or distances for which the gun is used. This is obviously a most important advantage, readily, obtainable according to my invention which invention I do not limit to the aforesaid exemplification of the manner in which it may be put into practice, seeing that there are many other similar arrangements of mechanism whereby a like result can be secured. For instance, instead of employing an indicating device having the conical spiral wheel G, I may adopt the alternative construction illustrated in elevation in Fig. 10, in section in Fig. 11, on the line $x$—$x$ of Fig. 10, and in another section, Fig. 12, taken at right angles to Fig. 11 on the line $y$—$y$ of the latter. In this construction I fix upon the spindle D a disk S with an involute rack S' formed upon the face thereof to gear with the pinion L sliding upon the shaft M' by which the indicating disks are operated, the variation of the radius of the involute being proportionate to the required variation of linear movement of the sight-bar. Or I may adopt, instead of this modification, an alternative construction illustrated in Figs. 13 and 14 which are views similar, respectively, to Figs. 11 and 12. In this device I arrange the details in such a manner that the crossing of the spindle D and shaft M' which occurs in the said Figs. 11 and 12 is avoided, and simplicity of construction is attained, by shortening the shaft D, making one of its bearings in a removable plug F⁴ screwed into the frame of the indicator, and placing the milled wheel E at the side of the sight-bar opposite to that at which it is situated in Fig. 11 for instance. The means whereby, in these modifications, the pinion L is maintained in gear with the involute racks are the same as are hereinbefore described with reference to the like devices in Fig. 1 for instance.

Figure 16:
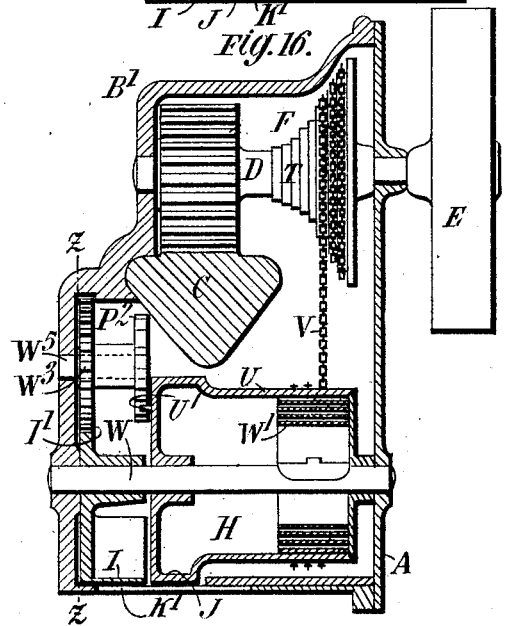
Figure 17:
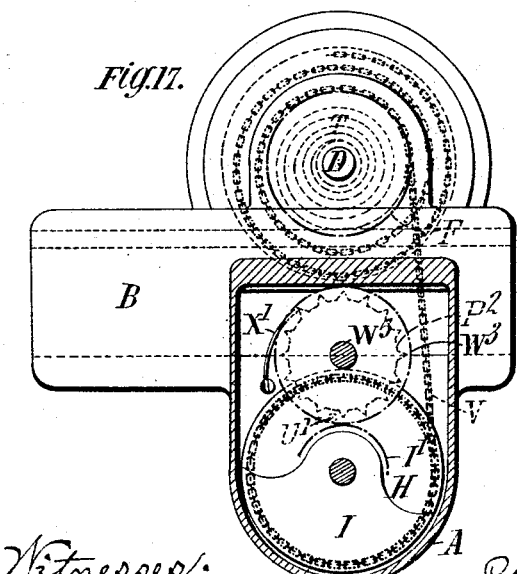
Figure 15:
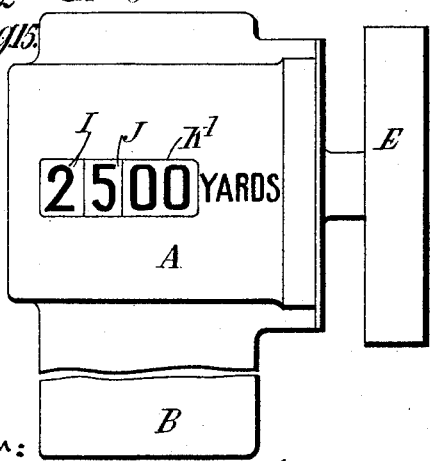

As a further alternative I employ the apparatus illustrated in elevation in Fig. 15, sectional plan in Fig. 16, and in section in Fig. 17, on the line $z$—$z$ of Fig. 16, in which apparatus I use a fusee T on the shaft D to operate a spring barrel U by means of a chain V, as in clocks and watches. The fusee, which is fixed upon the shaft D takes the place of the coned spiral G or of the involute rack S', and the barrel U is preferably provided with numerals upon the portion J of its periphery, which are visible through a suitable aperture K' in the indicator casing and are employed to indicate "hundreds." The fusee T is made with the increase of its diameter proportionate to the increments of movement of the sight-bar. The barrel U turns on the spindle W which is fixed in the casing of the indicator; it contains a coiled spring W', of which one end is attached to the barrel U and the other to the spindle W. A pin U' is placed upon the end of the barrel U to engage, once in each revolution, with the teeth of a toothed wheel P² journaled upon a spindle W⁵ secured to the frame of the indicator. A pinion W³ connected to the wheel P² gears with a toothed segment I' attached to a plain cylindrical segment I having the "thousands" figures thereon, which, like the "hundreds" figures, are visible through the opening K'. A spring X' bears upon the wheel P² and prevents it from revolving more than the proper distance when moved by the pin U' in the manner hereinafter described. The said spring also insures that the movement of the "thousands" segment shall only take place when effected by the aforesaid pin. When the sight-bar C is raised by the rotation of the spindle D the chain V which is fastened at the ends to the fusee and the barrel, is unwound from the latter, which is consequently rotated. Conversely, on lowering the sight-bar the spring W' effects the rotation of the barrel U to rewind the chain thereon. The barrel, in rotating, indicates the "hundreds" and imparts, upon the completion of every revolution, a partial rotation to the "thousands" segment I by means of the pin U', which, coming into gear, momentarily, with the wheel P², rotates it and the pinion W³ through a small distance, determined by the spring X'. The pinion W³ thus moved through a small angle, imparts the proper fraction of a revolution to the cylindrical "thousands" segment I by means of the toothed segment I' attached thereto.

The apparatus whereby the indicating disks I and J in Figs. 10 to 14, are geared together, is the same as that which is hereinbefore described with reference to Figs. 6 and 7, and therefore does not need further reference.

The gearing connecting the rotary indicating disks I and J of Figs. 1 and 2 is shown separately in Figs. 6 and 7, which represent it in elevation and vertical section respectively. In this mechanism the "thousands" disk I is secured to a collar $O^3$ which turns in a bearing in the frame of the indicator, and carries a pinion $O^2$. The "hundreds" disk J is secured upon one end of the aforesaid spindle M' which passes through the collar $O^3$. To the spindle M' a finger O and also a locking disk O' with a gap $O^0$ in its periphery, are secured. $P^3$ is a stud screwed into the frame of the indicator as shown. N' is a pinion rotatable upon the said stud and geared with the pinion $O^2$. P is a locking piece with several segmental gaps in its periphery; it is adapted to engage with the locking disk O'. $P^2$ is a star-wheel provided with radial slots $P^4$ to receive the end of the finger O. The pinion N', locking piece P, and star-wheel $P^2$ rotate together. When the spindle M' is turned the "hundreds" disk J is directly operated thereby, and whenever it completes a revolution the finger O enters one of the slots $P^4$ and rotates the star-wheel $P^2$, locking piece P, and pinion N', through a fraction of a revolution; the said pinion N' communicates this movement to the pinion $O^2$ which turns the "thousands" disk I; the thousands disk I can only be given intermittent movement, for the gap $O^0$ in the locking disk O' will be found, just previous to the entry of the finger O into each of the slots $P^4$ in the position in which it is shown in the drawings, that is to say, a position in which it offers no obstruction to the movement of the locking piece P; but, when the finger O has completed the movement of the star-wheel $P^2$ the locking disk O' will have turned to bring the circular portion of its periphery into one of the gaps of the locking piece P, so that the latter after turning for a proper distance with the parts to which it is connected, has its further movement prevented by the locking disk O' until the finger O again comes into readiness to operate it. Or I may use as an alternative the arrangement illustrated in elevation and section by Figs. 8 and 9, respectively, wherein a short arm $M^2$ is provided on the spindle M' and a toothed wheel N is secured to the pinion N'. A spring $N^3$ held in place by a pin secured to the casing of the indicator, bears on the wheel N, as shown. Once in every revolution of the "hundreds" wheel J and the spindle M' to which it is fixed, the short arm $M^2$ imparts a small angular movement to the wheel N equal to the pitch of the teeth of the latter. The wheel N is geared to the "thousands" disk I and imparts intermittent movement to the said disk, in like manner to the similar gearing hereinbefore described with reference to Figs. 6 and 7. The spring $N^3$ prevents the said wheel N from turning for a greater distance than that between two teeth as aforesaid, each time it is actuated by the arm $M^2$.

What I claim is—

1. In sighting and indicating-apparatus for ordnance, the combination of a sliding sight-bar, a guide wherein the sight-bar slides, a spindle supported in bearings on the guide and geared with the sight-bar, a tapering spiral secured on the said spindle, a rotary indicating device a circular member of which is in operative connection with the tapering spiral and is adapted to be rotated by the said tapering spiral through equal angles when the spindle is turned through varying angles, for the purpose specified.

2. In sighting and indicating-apparatus for ordnance, the combination of a sliding sight-bar, a guide wherein the sight-bar slides, a spindle geared with the sight-bar and having a toothed spiral thereon, and an indicating device characterized by a pinion and first motion shaft so constructed that the pinion can turn with but not upon the said shaft and can slide along the shaft axially, and also by a box or yoke which embraces the pinion and the spiral so that they are kept always in gear with each other, substantially as set forth.

3. In sighting and indicating-apparatus for ordnance, the combination of a sliding sight-bar, a guide wherein the sight-bar slides, a spindle geared with the sight-bar and having a toothed conical spiral thereon, and an indicating device characterized by a pinion and first-motion shaft so constructed that the pinion can turn with but not upon the said shaft and can slide along the shaft axially, and also by a box or yoke which embraces the pinion and the spiral so that they are kept always in gear with each other, substantially as set forth.

4. In sighting and indicating-apparatus for ordnance, the combination of a sliding sight-bar, a guide wherein the sight-bar slides, a spindle geared with the sight-bar and having a toothed conical spiral thereon, and an indicating device characterized by a pinion and a first-motion shaft inclined to the axis of the spiral and so constructed that the pinion can turn with but not upon the said shaft and can slide along the shaft axially, and also by a box or yoke which embraces the pinion and the spiral so that they are kept always in gear with each other, substantially as described.

In testimony whereof I have hereunto signed my name in the presence of two subscribing witnesses.

HUBERT HENRY GRENFELL.

Witnesses:
GEO. J. B. FRANKLIN,
T. F. BARNES.